United States Patent
Yu et al.

(10) Patent No.: US 10,297,860 B2
(45) Date of Patent: May 21, 2019

(54) LITHIUM SECONDARY BATTERY

(71) Applicant: LG Chem, Ltd., Seoul (KR)

(72) Inventors: Sung Hoon Yu, Daejeon (KR); Yoo Sun Kang, Daejeon (KR); Kyung Mi Lee, Daejeon (KR); Jin Hyun Park, Daejeon (KR); Jung Don Suk, Daejeon (KR); Doo Kyung Yang, Daejeon (KR)

(73) Assignee: LG Chem, Ltd. (KR)

( * ) Notice: Subject to any disclaimer, the term of this patent is extended or adjusted under 35 U.S.C. 154(b) by 586 days.

(21) Appl. No.: 14/247,679

(22) Filed: Apr. 8, 2014

(65) Prior Publication Data

US 2014/0220452 A1    Aug. 7, 2014

Related U.S. Application Data

(63) Continuation of application No. PCT/KR2014/000800, filed on Jan. 28, 2014.

(30) Foreign Application Priority Data

Jan. 28, 2013 (KR) .................. 10-2013-0009338
Jan. 27, 2014 (KR) .................. 10-2014-0009649

(51) Int. Cl.
 *H01M 10/0565* (2010.01)
 *H01M 10/052* (2010.01)
 (Continued)

(52) U.S. Cl.
 CPC ....... *H01M 10/0565* (2013.01); *H01M 4/134* (2013.01); *H01M 4/362* (2013.01);
 (Continued)

(58) Field of Classification Search
 CPC .............................................. H01M 10/0565
 See application file for complete search history.

(56) References Cited

U.S. PATENT DOCUMENTS 6,420,072 B1 * 7/2002 Maruyama ............ C08F 220/48
                                                    252/62.2
8,232,008 B2    7/2012 Morishima et al.
(Continued)

FOREIGN PATENT DOCUMENTS

CN          1423364 A      6/2003
CN        101340009 A      1/2009
(Continued)

OTHER PUBLICATIONS

International Search Report from PCT/KR2014/000800, dated May 13, 2014.
(Continued)

*Primary Examiner* — Stephan J Essex
(74) *Attorney, Agent, or Firm* — Lerner, David, Littenberg, Krumholz & Mentlik, LLP

(57) ABSTRACT

Provided are a lithium secondary battery including a cathode, an anode, a separator, and a gel polymer electrolyte, wherein i) the anode includes a silicon (Si)-based anode active material, ii) the gel polymer electrolyte is formed by polymerizing a composition that includes a monomer having a functional group bondable to metal ions, and iii) a charge voltage of the battery is in a range of 3.0 V to 5.0 V.

Since the lithium secondary battery of the present invention may prevent the movement of metal ions dissolved from a cathode to an anode or reduce the precipitation of metal on the anode, the lifetime of the battery may not only be improved but capacity characteristics of the battery may also be excellent even in the case in which the battery is charged at a high voltage as well as normal voltage.

16 Claims, 2 Drawing Sheets

(51) Int. Cl.
*H01M 4/134* (2010.01)
*H01M 4/36* (2006.01)
*H01M 4/38* (2006.01)
*H01M 10/058* (2010.01)

(52) U.S. Cl.
CPC ......... *H01M 4/386* (2013.01); *H01M 10/052* (2013.01); *H01M 10/058* (2013.01); *H01M 2300/0085* (2013.01); *Y10T 29/49108* (2015.01)

(56) References Cited

U.S. PATENT DOCUMENTS

| | | | |
|---|---|---|---|
| 2002/0034690 A1* | 3/2002 | Ono | C09K 19/00 429/306 |
| 2002/0114997 A1 | 8/2002 | Lee et al. | |
| 2003/0138703 A1 | 7/2003 | Yamaguchi et al. | |
| 2005/0231785 A1 | 10/2005 | Oh et al. | |
| 2005/0271939 A1 | 12/2005 | Xu et al. | |
| 2007/0037062 A1 | 2/2007 | Yamaguchi et al. | |
| 2007/0099090 A1 | 5/2007 | Oh et al. | |
| 2007/0212613 A1 | 9/2007 | Ishida et al. | |
| 2009/0029256 A1 | 1/2009 | Mah et al. | |
| 2009/0061324 A1 | 3/2009 | Yamaguchi et al. | |
| 2009/0169976 A1 | 7/2009 | Takahashi | |
| 2011/0129738 A1 | 6/2011 | Kawashima | |
| 2011/0256456 A1 | 10/2011 | Jeon et al. | |
| 2012/0060360 A1 | 3/2012 | Liu | |
| 2012/0321911 A1 | 12/2012 | Watanabe et al. | |
| 2014/0106236 A1 | 4/2014 | Kwon et al. | |
| 2016/0028113 A1 | 1/2016 | Jeon et al. | |

FOREIGN PATENT DOCUMENTS

| | | |
|---|---|---|
| CN | 101353435 A | 1/2009 |
| CN | 101609891 A | 12/2009 |
| CN | 101685876 A | 3/2010 |
| CN | 101774563 A | 7/2010 |
| CN | 101826635 A | 9/2010 |
| CN | 101872875 A | 10/2010 |
| CN | 102460787 A | 5/2012 |
| CN | 102574697 A | 7/2012 |
| CN | 102891010 A | 1/2013 |
| EP | 1098382 A2 | 5/2001 |
| EP | 2447216 A2 | 5/2012 |
| JP | H11-121012 A | 4/1999 |
| JP | 2000-021449 A | 1/2000 |
| JP | 2000268871 A | 9/2000 |
| JP | 2000-294284 A | 10/2000 |
| JP | 2000311715 A | 11/2000 |
| JP | 2000331533 A | 11/2000 |
| JP | 2001176556 A | 6/2001 |
| JP | 2002289255 A | 10/2002 |
| JP | 2003-168479 A | 6/2003 |
| JP | 2007287630 A | 11/2007 |
| JP | 2009163936 A | 7/2009 |
| JP | 2010-514134 A | 4/2010 |
| JP | 2011119097 A | 6/2011 |
| KR | 2004-0084117 A | 10/2004 |
| KR | 2006-0045803 A | 5/2006 |
| KR | 2007-0063772 A | 6/2007 |
| KR | 2008-0058197 A | 6/2008 |
| KR | 2009-0011888 A | 2/2009 |
| WO | 2012176575 A1 | 12/2012 |
| WO | 2013002504 A2 | 1/2013 |

OTHER PUBLICATIONS

Search report from European application No. 14728801.3 dated Dec. 9, 2014.
Search Report from Chinese Application No. 2014800012219 dated Oct. 8, 2016.
Du Ke, et al., "Effects from Feeding Ways during Preparing Li[Li0.2Co0.13Ni0.13Mn0.54]O2 by Carbonate Coprecipitation Method." Chinese Journal of Inorganic Chemistry, Jan. 2012, vol. 28, No. 1, pp. 74-78. (English translation of Abstract only).
International Search Report from PCT/KR2014/000793 dated May 13, 2014.
Machine translation of WO 2012/176575.
Search Report from European Application No. 14728802.1 dated Dec. 9, 2014.
Search Report from Chinese Application No. 2014800012219 dated Apr. 5, 2017.

* cited by examiner

LITHIUM SECONDARY BATTERY

CROSS-REFERENCE TO RELATED APPLICATIONS

This application is a continuation of International Application No. PCT/KR2014/000800, filed Jan. 28, 2014, which claims benefit of Korean Patent Application Nos. 10-2014-0009649, filed Jan. 27, 2014 and 10-2013-0009338, filed Jan. 28, 2013, the disclosures of which are incorporated herein by reference.

TECHNICAL FIELD

The present invention relates to a lithium secondary battery including a cathode; an anode; a separator; and a gel polymer electrolyte, and more particularly, to a lithium secondary battery in which the anode includes a silicon (Si)-based anode active material, the gel polymer electrolyte is formed by polymerizing a composition that includes a monomer having a functional group bondable to metal ions, and a charge voltage of the battery is in a range of 3.0 V to 5.0 V.

BACKGROUND ART

Recently, in line with portable, miniaturization, lightweight, and high-performance trends in electronic devices, electronics, information and telecommunications industries have rapidly grown. Accordingly, high-performance lithium secondary batteries are being used as power sources of these portable electronic devices, and the demand therefor is being rapidly increased. Secondary batteries, which can be repeatedly used by being charged and discharged, are essential for power sources of portable electronic devices for information and telecommunication, electric bikes, or electric vehicles. In particular, since the performance of these products may depend on batteries as a key component, customer demand for high-capacity batteries is being increased.

In general, it is known that battery safety improves in the order of a liquid electrolyte, a gel polymer electrolyte, and a solid polymer electrolyte, but battery performance decreases in the same order.

An electrolyte in a liquid state, particularly, an ion conductive organic liquid electrolyte, in which a salt is dissolved in a non-aqueous organic solvent, has been mainly used as an electrolyte for an electrochemical device, such as a typical battery using an electrochemical reaction and an electric double-layer capacitor. However, when the electrolyte in a liquid state is used, an electrode material may degrade and the organic solvent is likely to be volatilized. Also, there may be limitations in safety such as combustion due to ambient temperature and the temperature rise of the battery itself.

It is known that the solid polymer electrolyte has not been commercialized yet due to poor battery performance.

Since the gel polymer electrolyte may have excellent electrochemical safety, the thickness of the battery may be constantly maintained. Furthermore, since a contact between an electrode and the electrolyte may be excellent due to the inherent adhesion of a gel phase, a thin-film type battery may be prepared. Thus, the development of various gel polymer electrolytes is being expanded.

In the gel polymer electrolyte, since the size of lithium ions may be small, direct movement may not only be relatively easy, but also the lithium ions may easily move in the electrolyte solution due to a hopping phenomenon as illustrated in FIG. 1.

When the metal ions are dissolved, the metal ions may be reduced to a metallic state in an anode to block reaction sites of the anode. When the new metal is precipitated on the surface of the anode, an electrolyte solution produces a new solid electrolyte interface (SEI) layer on the surface of the metal, and thus, the electrolyte solution is continuously consumed. Also, since the thickness of the SEI layer in the anode may be continuously increased to increase resistance, life characteristics of the lithium secondary battery may be decreased. Thus, there is a need to improve the above limitations.

DISCLOSURE OF THE INVENTION

Technical Problem

The present invention provides a lithium secondary battery which may reduce the precipitation of metal on an anode by preventing the movement or decreasing the movement speed of metal ions dissolved from a cathode to the anode, and thus, the lifetime of the battery may not only be improved but capacity characteristics of the battery may also be excellent at both normal and high voltages.

Technical Solution

According to an aspect of the present invention, there is provided a lithium secondary battery including a cathode; an anode; a separator; and a gel polymer electrolyte, wherein i) the anode includes a silicon (Si)-based anode active material, ii) the gel polymer electrolyte is formed by polymerizing a composition that includes a monomer having a functional group bondable to metal ions, and iii) a charge voltage of the battery is in a range of 3.0 V to 5.0 V.

According to another aspect of the present invention, there is provided a method of preparing a lithium secondary battery including inserting an electrode assembly including a cathode, an anode, and a separator disposed between the cathode and the anode into a battery case; and injecting a composition for a gel polymer electrolyte into the battery case and polymerizing the composition to form a gel polymer electrolyte, wherein the composition for a gel polymer electrolyte includes an electrolyte solution solvent; an ionizable lithium salt; a polymerization initiator; and a monomer having a functional group bondable to metal ions.

Advantageous Effects

A lithium secondary battery according to an embodiment of the present invention may reduce the precipitation of metal on an anode by preventing the movement or decreasing the movement speed of metal ions dissolved from a cathode to the anode, and thus, the lifetime of the battery may not only be improved but capacity characteristics of the battery may also be excellent at both normal and high voltages.

MODE FOR CARRYING OUT THE INVENTION

Figure 1:
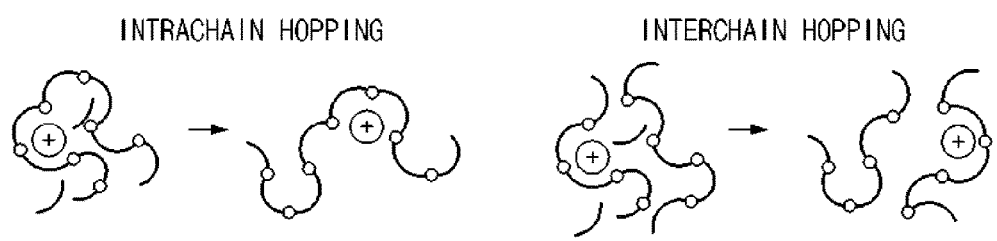
FIG. 1 illustrates a principle of the movement of lithium ions when a gel polymer electrolyte is used.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A lithium secondary battery of the present invention includes a cathode; an anode; a separator; and a gel polymer electrolyte, wherein i) the anode includes a silicon (Si)-based anode active material, ii) the gel polymer electrolyte is formed by polymerizing a composition that includes a monomer having a functional group bondable to metal ions, and iii) a charge voltage of the battery is in a range of 3.0 V to 5.0 V.

In an electrolyte of a lithium secondary battery according to an embodiment of the present invention, the composition, as a composition for a gel polymer electrolyte, may include an electrolyte solution solvent, an ionizable lithium salt, a polymerization initiator, and a monomer having a functional group bondable to metal ions, as a monomer which may form a gel polymer by a polymerization reaction.

The monomer having the functional group is acrylonitrile or an acrylate-based monomer, and preferably, the functional group may include any one selected from the group consisting of

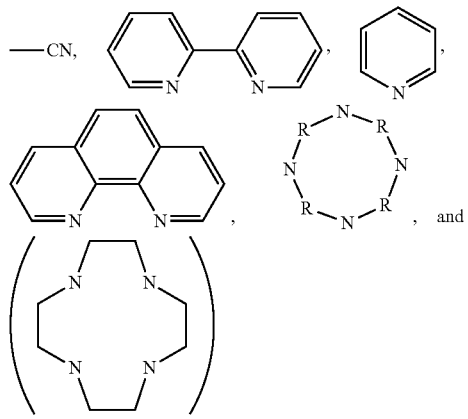

which are substituted or unsubstituted with $C_1$-$C_5$ alkyl or halogen, or a mixture of two or more thereof.

Representative examples of the monomer having the functional group according to an embodiment of the present invention may be any one selected from the group consisting of the following compounds or a mixture of two or more thereof:

(1) 2-cyanoethyl acrylate;

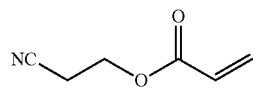

(2) 2-cyanoethoxyethyl acrylate;

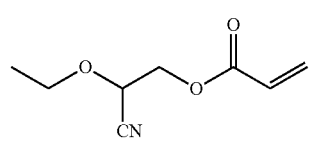

(3) acrylonitrile;

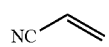

(4) ethyl (E)-3-(pyridin-2-yl)-acrylate;

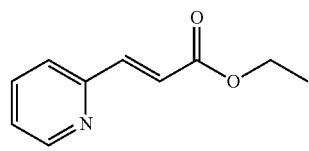

(5) ethyl (E)-3-(4-pyridinyl)-2-propenoate;

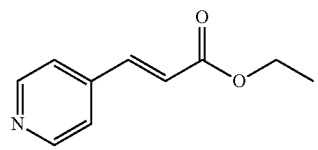

(6) 2-propenoic acid, 3,3'-[2,2'-bipyridine]-4,4'-diylbis-, dimethyl ester;

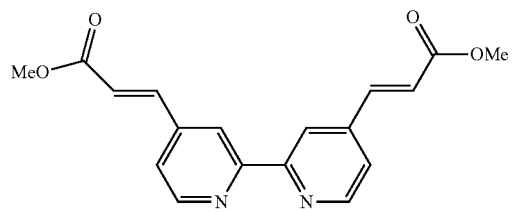 [SMILES: COC(=O)/C=C/c1ccnc(-c2cc(/C=C/C(=O)OC)ccn2)c1]

(7) 2-propenoic acid, 2-[2,2'-bipyridine]-6-ylethyl ester;
(8) 2-propenoic acid, 2-[2,2'-bipyridine]-5-ylethyl ester;
(9) 2-propenoic acid, 2-[2,2'-bipyridine]-4-ylethyl ester;
(10) 2-propenoic acid, 1,1'-[[2,2'-bipyridine]-4,4'-diylbis (methylene)]ester;
(11) 2-propenoic acid, 1,10-phenanthroline-2,9-diylbis (methylene) ester;
(12) 2-propenoic acid, 3-(1,10-phenanthroline-2-yl)-phenylmethyl ester; and
(13) 2-propenoic acid, 2-[[(1-oxo-2-propenyl)oxy]methyl]-2-[(1,10-phenanthroline-5-ylmethoxy)methyl]-1,3-propanediyl ester.

Among these compounds, any one selected from the group consisting of 2-cyanoethyl acrylate, 2-cyanoethoxyethyl acrylate, acrylonitrile, and ethyl (E)-3-(pyridin-2-yl)-acrylate, or a mixture of two or more thereof may be particularly used.

According to an embodiment of the present invention, since the monomer having the functional group includes the functional group in the monomer, the functional group may be stably fixed in a gel structure in the gel polymer electrolyte.

For example, in a case where a complex is formed by respectively adding a cyano group and acrylate to the composition for a gel polymer electrolyte (gel electrolyte solution) and polymerizing, the complex itself may move in the composition for a gel polymer electrolyte so that reduction may occur at an anode and metal may be precipitated. However, according to an embodiment of the present invention, in a case where 2-cyanoethylacrylate is used as the monomer having the functional group, since a cyano group is included in the monomer having the functional group, the cyano group itself may not move in the gel structure.

Figure 2:
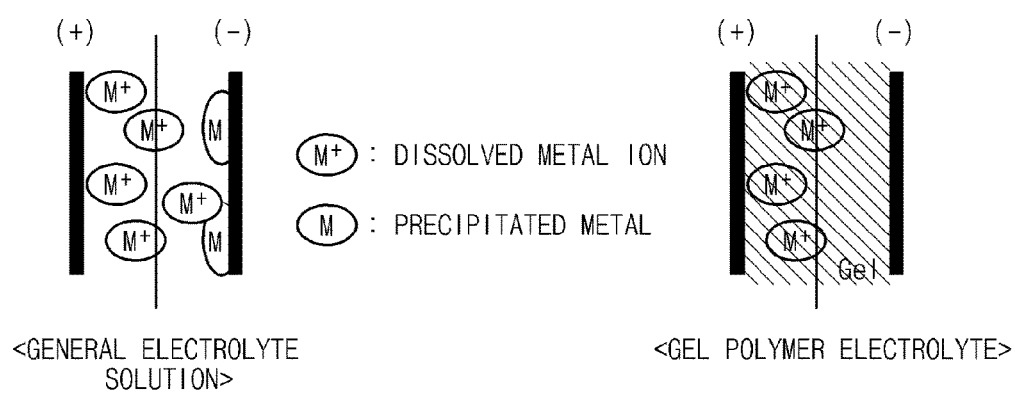
FIG. 2 compares degrees of precipitated metal on an anode according to the uses of a typical electrolyte solution and a gel polymer electrolyte according to an embodiment of the present invention.

That is, according to an embodiment of the present invention, as illustrated in FIG. 2, in a case where the monomer having the functional group is used in the composition for a gel polymer electrolyte, the monomer having the functional group may be bonded to metal ions dissolved from a cathode to reduce the precipitation of metal on an anode, different from a case of using a typical electrolyte solution in which metal ions dissolved from the cathode is precipitated on the anode. Thus, charge and discharge efficiency of a lithium secondary battery may be improved and good cycle characteristics may be exhibited. In addition, in a case where the composition for a gel polymer electrolyte including the monomer having the functional group is used in a lithium secondary battery, capacity characteristics may be improved in both normal and high voltage ranges.

The expression "normal voltage" used in the present specification denotes a case in which a charge voltage of the lithium secondary battery is in a range of 3.0 V to less than 4.3 V, and the expression "high voltage" denotes a case in which a charge voltage is in a range of 4.3 V to 5.0 V.

The monomer having the functional group may be included in an amount of 0.1 wt % to 10 wt %, for example, 0.5 wt % to 5 wt % based on a total weight of the composition. In the case that the amount of the monomer having the functional group is less than 0.1 wt %, gelation may be difficult, and thus, characteristics of the gel polymer electrolyte may not be exhibited. In the case in which the amount of the monomer is greater than 10 wt %, resistance may increase due to the excessive amount of the monomer, and thus, battery performance may decrease.

Also, according to an embodiment of the present invention, the composition further includes a monomer having 2 to 6 acrylate groups, and the monomer may be a branched monomer.

The branched monomer, for example, may be any one selected from the group consisting of ditrimethylolpropane tetraacrylate, dipentaerythritol pentaacrylate, and dipentaerythritol hexaacrylate, or a mixture of two or more thereof.

The branched monomer may be included in an amount of 0.1 wt % to 10 wt %, for example, 0.5 wt % to 5 wt % based on the total weight of the composition.

According to an embodiment of the present invention, in a case where the composition further includes the branched monomer, the monomer having the functional group and the branched monomer may be mixed and reacted at a temperature ranging from 30° C. to 100° C. for 2 minutes to 12 hours to prepare a polymerizable monomer. In this case, a content ratio (weight ratio) of the monomer having the functional group to the branched monomer, for example, may be in a range of 1:0.1 to 1:10. However, the present invention is not limited thereto.

The ionizable lithium salt included in the composition of the present invention, for example, may be any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_2$, or a mixture of two or more thereof. However, the present invention is not limited thereto.

Also, any electrolyte solution solvent typically used in an electrolyte solution for a lithium secondary battery may be used as the electrolyte solution solvent used in the present invention without limitation, and for example, ether, ester, amide, linear carbonate, or cyclic carbonate may be used alone or in a mixture of two or more thereof.

Among these materials, the cyclic carbonate, the linear carbonate, or a carbonate compound as a mixture thereof may be typically included. Specific examples of the cyclic carbonate may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof, or a mixture of two or more thereof. Also, specific examples of the linear carbonate may be any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof. However, the present invention is not limited thereto.

In particular, since propylene carbonate and ethylene carbonate, as cyclic carbonates among the carbonate-based electrolyte solution solvents, are highly viscous organic solvents and have high dielectric constants, the propylene carbonate and ethylene carbonate may well dissociate the lithium salt in the electrolyte solution. Thus, the propylene carbonate and ethylene carbonate may be used. Since an electrolyte solution having high electrical conductivity may be prepared when the above cyclic carbonate is mixed with low viscosity, low dielectric constant linear carbonate, such as ethylmethyl carbonate, diethyl carbonate, and dimethyl carbonate, in an appropriate ratio, the propylene carbonate and ethylene carbonate, for example, may be used.

Also, any one selected from the group consisting of methyl acetate, ethyl acetate, propyl acetate, methyl propionate, ethyl propionate, γ-butyrolactone, γ-valerolactone, γ-caprolactone, σ-valerolactone, and ε-caprolactone, or a mixture of two or more thereof may be used as the ester among the electrolyte solution solvents. However, the present invention is not limited thereto.

In the present invention, a typical polymerization initiator known in the art may be used as the polymerization initiator.

Non-limiting examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and azo compounds such as 2,2'-azobis(2-cyanobutane), 2,2'-azobis(methylbutyronitrile), 2,2'-azobis(iso-butyronitrile) (AIBN), and 2,2'-azobis(dimethylvaleronitrile) (AMVN). However, the present invention is not limited thereto.

The polymerization initiator may be dissociated by heat in the battery, for a non-limiting example, at a temperature of 30° C. to 100° C. or may be dissociated at room temperature (5° C. to 30° C.) to form a radical, and may be reacted with a polymerizable monomer by free radical polymerization to form a gel polymer electrolyte.

Also, the polymerization initiator may be used in an amount of 0.01 wt % to 2 wt % based on the total weight of the composition. In the case that the amount of the polymerization initiator is greater than 2 wt %, the gelation may occur too quickly during the injection of the composition for a gel polymer electrolyte into the battery or the unreacted initiator may remain to adversely affect the battery performance afterwards. In contrast, in the case in which the amount of the polymerization initiator is less than 0.01 wt %, the gelation may not be well performed.

The composition according to the present invention may selectively include other additives known in the art, in addition to the above-described components.

Also, according to an embodiment of the present invention, the present invention may provide a method of preparing a lithium secondary battery including: inserting an electrode assembly including a cathode, an anode, and a separator disposed between the cathode and the anode into a battery case; and injecting a composition for a gel polymer electrolyte into the battery case and polymerizing the composition to form a gel polymer electrolyte, wherein the composition for a gel polymer electrolyte includes an electrolyte solution solvent; an ionizable lithium salt; a polymerization initiator; and a monomer having a functional group bondable to metal ions. The gel polymer electrolyte according to an embodiment of the present invention is formed by polymerizing the above-described composition for a gel polymer electrolyte according to a typical method known in the art. For example, the gel polymer electrolyte may be formed by in-situ polymerization of the composition for a gel polymer electrolyte in the secondary battery.

According to an exemplary embodiment of the present invention, the method may include (a) inserting an electrode assembly formed of a cathode, an anode, and a separator disposed between the cathode and the anode into a battery case, and (b) injecting a composition for a gel polymer electrolyte into the battery case and polymerizing the composition to form an electrolyte.

An in-situ polymerization reaction in the lithium secondary battery may be performed by heat polymerization. In this case, polymerization time required may be in a range of about 2 minutes to 12 hours, and heat polymerization temperature may be in a range of 30° C. to 100° C.

When the gelation by the polymerization reaction is completed, a gel polymer electrolyte is formed. Specifically, a gel polymer is formed, in which polymerizable monomers are cross-linked each other by the polymerization reaction, and the gel polymer thus formed may be uniformly impregnated with a liquid electrolyte solution, in which an electrolyte salt is dissociated in an electrolyte solution solvent.

An electrode of the lithium secondary battery of the present invention may be prepared by a typical method known in the art. For example, a binder, a conductive agent, and a dispersant, if necessary, as well as a solvent are mixed with an electrode active material and stirred to prepare a slurry, and a metal current collector is then coated with the slurry and pressed. Thereafter, the electrode may be prepared by drying the metal current collector.

In the present invention, any compound may be used as a cathode active material in the cathode without limitation as long as it may be used at a normal voltage or high voltage and may reversibly intercalate/deintercalate lithium.

According to an embodiment of the present invention, in the cathode, the cathode active material usable at a normal voltage, for example, may include any one selected from the group consisting of $LiCoO_2$, $LiNiO_2$, $LiMnO_2$, $LiMn_2O_4$, $LiNi_{1-y}Co_yO_2$ (0≤y<1), $LiCo_{1-y}Mn_yO_2$ (0≤y<1), $LiNi_{1-y}Mn_yO_2$ (0≤y<1), and $Li(Ni_aCo_bMn_c)O_2$ (0<a,b,c≤1, a+b+c=1), or a mixture of two or more thereof. However, the present invention is not limited thereto. Also, sulfide, selenide, and halide may be included in addition to the above oxides.

In a lithium secondary battery according to another embodiment of the present invention, the cathode active material usable at a high voltage may include any one selected from the group consisting of spinel lithium transition metal oxides having a hexagonal layered rock-salt structure with high capacity characteristics, an olivine structure, and a cubic structure, $V_2O_5$, TiS, and MoS, or a composite oxide of two or more thereof.

Specifically, the cathode active material, for example, may include any one selected from the group consisting of compounds of Chemical Formulas 1 to 3, or a mixture of two or more thereof.

$Li[Li_xNi_aCo_bMn_c]O_2$      <Chemical Formula 1>

(where 0<x≤0.3, 0.3≤c≤0.7, 0<a+b<0.5, and x+a+b+c=1);

$LiMn_{2-x}M_xO_4$      <Chemical Formula 2>

(where M is one or more elements selected from the group consisting of nickel (Ni), cobalt (Co), iron (Fe), phosphorus (P), sulfur (S), zirconium (Zr), titanium (Ti), and aluminum (Al), and 0<x≤2);

$Li_{1+a}Co_xM_{1-x}AX_4$      <Chemical Formula 3>

(where M is one or more elements selected from the group consisting of Al, magnesium (Mg), Ni, Co, manganese (Mn), Ti, gallium (Ga), copper (Cu), vanadium (V), niobium (Nb), Zr, cerium (Ce), indium (In), zinc (Zn), and yttrium (Y), X is one or more elements selected from the group consisting of oxygen (O), fluorine (F), and nitrogen (N), A is P, S, or a mixed element thereof, 0≤a≤0.2, and 0.5≤x≤1).

The cathode active material may satisfy 0.4≤c≤0.7 and 0.2≤a+b<0.5 in Chemical Formula 1, and may include any one selected from the group consisting of $LiNi_{0.5}Mn_{1.5}O_4$, $LiCoPO_4$, and $LiFePO_4$, or a mixture of two or more thereof.

In the anode of the lithium secondary battery according to an embodiment of the present invention, a Si-based anode active material including Si that is used in the art may be used as an anode active material. For example, the anode active material may include any one selected from the group consisting of Si alone; a Si—C composite which is formed by mechanical alloying of Si and a carbonaceous material; a composite which is formed by mechanical alloying of Si and metal; a carbon-Si nanocomposite; Si oxides ($SiO_x$, 1≤x≤2); and carbon-coated Si or Si oxide, or a mixture of two or more thereof. The carbonaceous material in the Si—C composite may be any one selected from the group consisting of natural graphite, artificial graphite, mesocarbon microbeads (MCMB), carbon fibers, and carbon black, or a mixture of two or more thereof. In a case where the Si—C composite is used, a ratio of silicon (Si) to carbon (C) in the Si—C composite may be in a range of 40 parts by weight:60 parts by weight to 80 parts by weight:20 parts by weight. Also, since SiO or $SiO_2$, as the Si oxide, may play a buffering role in alleviating the volume change of Si by forming $Li_2O$ and lithium silicate as inert phases during the reaction with lithium, the SiO or $SiO_2$ may improve capacity characteristics. Furthermore, in the composite which is formed by mechanical alloying of Si and metal, the metal may be selected from the group consisting of Ti, V, chromium (Cr), Mn, Fe, Co, Ni, Cu, Zr, Nb, molybdenum (Mo), tantalum (Ta), tungsten (W), hafnium (Hf), rhenium (Re), silver (Ag), gold (Au), Al, Zn, tin (Sn), antimony (Sb), and a combination thereof.

The anode of the lithium secondary battery according to the embodiment of the present invention may further include a carbon-based material, such as graphite, in the Si-based anode active material.

A slurry is prepared by mixing and stirring the anode or cathode active material, a binder, a solvent, and a conductive agent and a dispersant which may be typically used if necessary. Then, the anode or the cathode may be prepared by coating a current collector with the slurry and pressing the coated current collector.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, and various copolymers, may be used as the binder.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Furthermore, a typical porous nonwoven fabric, for example, a nonwoven fabric formed of high melting point glass fibers or polyethylene terephthalate fibers may be used. However, the present invention is not limited thereto.

A shape of the lithium secondary battery of the present invention is not particularly limited, and for example, a cylindrical type using a can, a prismatic type, a pouch type, or a coin type may be used.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

EXAMPLES

Hereinafter, the present invention will be described in more detail, according to examples and experimental examples. However, the present invention is not limited thereto.

Example 1

Preparation of Composition for Gel Polymer Electrolyte

An electrolyte solution was prepared by dissolving $LiPF_6$ in a non-aqueous electrolyte solution solvent having a composition, in which a volume ratio of ethylene carbonate (EC) to ethylmethyl carbonate (EMC) was 1:2, to obtain a $LiPF_6$ concentration of 1 M. A composition for a gel polymer electrolyte was prepared by adding 5 parts by weight of a polymerizable monomer (2.5 parts by weight of 2-cyanoethyl acrylate and 2.5 parts by weight of ditrimetylolpropane tetraacrylate) and 0.25 parts by weight of t-butylperoxy-2-ethylhexanoate as a polymerization initiator based on 100 parts by weight of the electrolyte solution.

<Preparation of Coin-Type Secondary Battery>

Cathode Preparation

A cathode mixture slurry was prepared by adding 94 wt % of $Li[Li_{0.29}Ni_{0.14}Co_{0.11}Mn_{0.46}]O_2$ as a cathode active material, 3 wt % of carbon black as a conductive agent, and 3 wt % of polyvinylidene fluoride (PVdF) as a binder to N-methyl-2-pyrrolidone (NMP) as a solvent. An about 20 μm thick aluminum (Al) thin film as a cathode current collector was coated with the cathode mixture slurry and dried, and the Al thin film was then roll-pressed to prepare a cathode.

Anode Preparation

As an anode active material, carbon-coated SiO and graphite were mixed at a weight ratio of 10:90. The anode active material, carbon black as a conductive agent, SBR, and CMC were mixed at a weight ratio of 94:2:2:2. The mixture thus prepared was put in distilled water as a solvent and mixed to prepare a homogeneous anode slurry.

A 10 μm thick copper (Cu) thin film as an anode current collector was coated with the anode slurry, dried, and pressed, and an anode is then prepared by punching the Cu thin film.

Battery Preparation

A battery was assembled using the cathode, the anode, and a separator formed of three layers of polypropylene/polyethylene/polypropylene (PP/PE/PP), and the prepared composition for a gel polymer electrolyte was injected into the assembled battery. Then, a coin-type secondary battery was prepared by heating the assembled battery to 80° C. for 2 minutes to 30 minutes in a nitrogen atmosphere.

Example 2

A coin-type secondary battery was prepared in the same manner as in Example 1 except that 2-cyanoethoxyethyl acrylate was used instead of 2-cyanoethyl acrylate in the preparation of the composition for a gel polymer electrolyte of Example 1.

Example 3

A coin-type secondary battery was prepared in the same manner as in Example 1 except that acrylonitrile was used instead of 2-cyanoethyl acrylate in the preparation of the composition for a gel polymer electrolyte of Example 1.

Example 4

A coin-type secondary battery was prepared in the same manner as in Example 1 except that ethyl (E)-3-(pyridin-2-yl)-acrylate was used instead of 2-cyanoethyl acrylate in the preparation of the composition for a gel polymer electrolyte of Example 1.

Comparative Example 1

A coin-type secondary battery was prepared in the same manner as in Example 1 except that a polymerizable monomer and a polymerization initiator were not used in the preparation of the composition for a gel polymer electrolyte of Example 1.

Comparative Example 2

A coin-type secondary battery was prepared in the same manner as in Example 1 except that 5 parts by weight of ditrimetylolpropane tetraacrylate was used alone instead of using 5 parts by weight of a polymerizable monomer that was prepared by mixing 2.5 parts by weight of 2-cyanoethyl acrylate and 2.5 parts by weight of ditrimetylolpropane tetraacrylate in the preparation of the composition for a gel polymer electrolyte of Example 1.

Comparative Example 3

A coin-type secondary battery was prepared in the same manner as in Example 1 except that 5 parts by weight of dipentaerythritol pentaacrylate was used alone instead of using 5 parts by weight of a polymerizable monomer that was prepared by mixing 2.5 parts by weight of 2-cyanoethyl acrylate and 2.5 parts by weight of ditrimetylolpropane tetraacrylate in the preparation of the composition for a gel polymer electrolyte of Example 1.

Comparative Example 4

A coin-type secondary battery was prepared in the same manner as in Example 1 except that graphite was used alone instead of using an anode active material, a mixture of carbon-coated SiO and graphite, in the preparation of the anode of Example 1.

Experimental Example

The lithium secondary batteries (battery capacity: 4.5 mAh) prepared in Examples 1 to 4 and Comparative Examples 1 to 4 were charged at a constant current of 0.7 C to a voltage of 4.3 V at 55° C. Thereafter, the lithium secondary batteries were charged at a constant voltage of 4.3 V and the charge was terminated when a charge current became 0.225 mA. After the batteries were left standing for 10 minutes, the batteries were discharged at a constant current of 0.5 C to a voltage of 3.0 V. The charge and discharge were repeated for 40 cycles and battery capacities were then measured. The results thereof are presented in FIG. 3.

Figure 3:
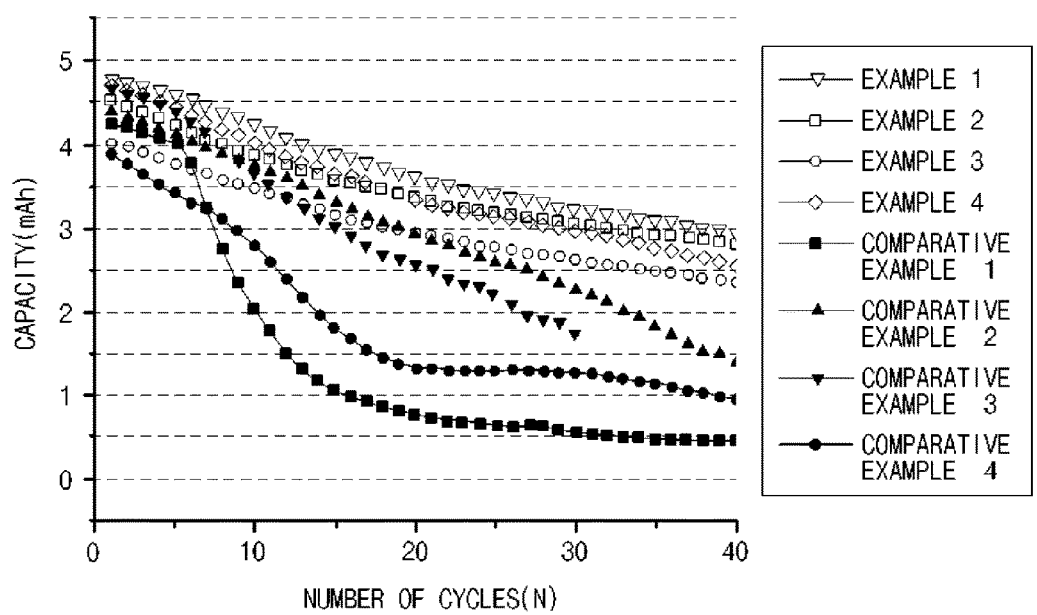
FIG. 3 is a graph illustrating capacities of lithium secondary batteries prepared in Examples 1 to 4 and Comparative Examples 1 to 4 at a high voltage of 4.3 V.

Specifically, as illustrated in FIG. 3, capacities of Examples 1 to 4 and Comparative Examples 1 to 4 were almost similar to one another to a 5$^{th}$ cycle. However, the capacities of Comparative Examples 1 to 4 began to decrease after about a 10$^{th}$ cycle and were rapidly decreased in a 20$^{th}$ cycle. In contrast, Examples 1 to 4 had relatively slow slopes of the changes in capacity in comparison to Comparative Examples 1 to 4, and particularly, Examples 1 to 4 exhibited capacities that were 2 to 4 times or more those of Comparative Examples 1 to 4 even in a 40$^{th}$ cycle.

Therefore, it may be understood that the discharge capacities of the batteries prepared in Examples 1 to 4 that were charged at a high voltage of 4.3 V after the 40$^{th}$ cycle were significantly improved in comparison to those of the batteries prepared in Comparative Examples 1 to 4.

INDUSTRIAL APPLICABILITY

Since a lithium secondary battery according to an embodiment of the present invention may not only improve the lifetime of the battery but may also have excellent capacity characteristics at both normal and high voltages, it may be suitable for secondary batteries.

The invention claimed is:
1. A lithium secondary battery comprising:
a cathode;
an anode comprising a silicon (Si)-based anode active material;
a separator; and
a gel polymer electrolyte formed by polymerizing a single composition that includes one or more monomers,
wherein the one or more monomers are selected from the group consisting of a monomer having a functional group bondable to metal ions, wherein the functional group is any one selected from the group consisting of

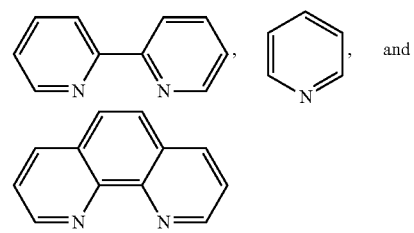

which are substituted or unsubstituted with $C_1$-$C_5$ alkyl or halogen, or a mixture of two or more thereof, and wherein the nitrogen on the functional group is unsubstituted, and a branched monomer having 2 to 6 acrylate groups,
wherein the one or more monomers are the only monomers present in the composition,
wherein the composition includes a monomer having a functional group bondable to metal ions, and
wherein a charge voltage of the battery is in a range of 3.0 V to 5.0 V.
2. The lithium secondary battery of claim 1, wherein the anode active material comprises any one selected from the group consisting of Si alone; a Si—C composite which is formed by mechanical alloying of Si and a carbonaceous material; a composite which is formed by mechanical alloying of Si and metal; a carbon-Si nanocomposite; Si oxides; and carbon-coated Si or Si oxide, or a mixture of two or more thereof.
3. The lithium secondary battery of claim 2, wherein a ratio of silicon (Si) to carbon (C) in the Si—C composite is in a range of 40 parts by weight:60 parts by weight to 80 parts by weight:20 parts by weight.
4. The lithium secondary battery of claim 2, wherein the carbonaceous material is any one selected from the group consisting of natural graphite, artificial graphite, mesocarbon microbeads (MCMB), carbon fibers, and carbon black, or a mixture of two or more thereof.
5. The lithium secondary battery of claim 1, wherein the monomer having the functional group is an acrylate-based monomer.
6. The lithium secondary battery of claim 1, wherein the monomer having the functional group is any one selected from the group consisting of:
ethyl (E)-3-(pyridin-2-yl)-acrylate;
ethyl (E)-3-(4-pyridinyl)-2-propenoate;
2-propenoic acid, 3,3'-[2,2'-bipyridine]-4,4'-diylbis-, dimethyl ester;
2-propenoic acid, 2-[2,2'-bipyridine]-6-ylethyl ester;
2-propenoic acid, 2-[2,2'-bipyridine]-5-ylethyl ester;
2-propenoic acid, 2-[2,2'-bipyridine]-4-ylethyl ester;
2-propenoic acid, 1,1'-[[2,2'-bipyridine]-4,4'-diylbis(methylene)] ester;

2-propenoic acid, 1,10-phenanthroline-2,9-diylbis(methylene) ester;
2-propenoic acid, 3-(1,10-phenanthroline-2-yl)-phenylmethyl ester;
2-propenoic acid, 2-[[(1-oxo-2-propenyl)oxy]methyl]-2-[(1,10-phenanthroline-5-ylmethoxy)methyl]-1,3-propanediyl ester; and mixtures of two or more thereof.

7. The lithium secondary battery of claim 1, wherein the composition comprises an electrolyte solution solvent, an ionizable lithium salt, a polymerization initiator, and the monomer having a functional group bondable to metal ions.

8. The lithium secondary battery of claim 1, wherein the branched monomer is any one selected from the group consisting of ditrimethylolpropane tetraacrylate, dipentaerythritol pentaacrylate, and dipentaerythritol hexaacrylate, or a mixture of two or more thereof.

9. The lithium secondary battery of claim 7, wherein the monomer having the functional group is included in an amount of 0.1 wt % to 10 wt % based on a total weight of the composition.

10. The lithium secondary battery of claim 1, wherein the branched monomer is included in an amount of 0.1 wt % to 10 wt % based on the total weight of the composition.

11. The lithium secondary battery of claim 1, wherein a content ratio (weight ratio) of the monomer having the functional group to the branched monomer is in a range of 1:0.1 to 1:10.

12. The lithium secondary battery of claim 1, wherein a cathode active material for the cathode is any one selected from the group consisting of compounds of Chemical Formulas 1 to 3, or a mixture of two or more thereof:

Li[Li$_x$Ni$_a$Co$_b$Mn$_c$]O$_2$      <Chemical Formula 1>

(where 0≤x<0.3, 0.3≤c≤0.7, 0<a+b<0.5, and x+a+b+c=1);

LiMn$_{2-x}$M$_x$O$_4$      <Chemical Formula 2>

(where M is one or more elements selected from the group consisting of nickel (Ni), cobalt (Co), iron (Fe), phosphorus (P), sulfur (S), zirconium (Zr), titanium (Ti), and aluminum (Al), and 0<x≤2);

Li$_{1+a}$Co$_x$M$_{1-x}$AX$_4$      <Chemical Formula 3>

(where M is one or more elements selected from the group consisting of Al, magnesium (Mg), Ni, Co, manganese (Mn), Ti, gallium (Ga), copper (Cu), vanadium (V), niobium (Nb), Zr, cerium (Ce), indium (In), zinc (Zn), and yttrium (Y), X is one or more elements selected from the group consisting of oxygen (O), fluorine (F), and nitrogen (N), A is P, S, or a mixed element thereof, 0≤a≤0.2, and 0.5≤x≤1).

13. The lithium secondary battery of claim 1, wherein a cathode active material for the cathode is any one selected from the group consisting of LiCoO$_2$, LiNiO$_2$, LiMnO$_2$, LiMn$_2$O$_4$, LiNi$_{1-y}$Co$_y$O$_2$(0≤y<1), LiCo$_{1-y}$Mn$_y$O$_2$(0≤y<1), LiNi$_{1-y}$Mn$_y$O$_2$(0≤y<1), and Li(Ni$_a$Co$_b$Mn$_c$)O$_2$(0<a,b,c≤1, a+b+c=1), or a mixture of two or more thereof.

14. A method of preparing a lithium secondary battery, the method comprising:
inserting an electrode assembly including a cathode, an anode comprising a silicon (Si)-based anode active material, and a separator disposed between the cathode and the anode into a battery case; and
injecting a composition for a gel polymer electrolyte into the battery case and polymerizing the composition to form a gel polymer electrolyte,
wherein the composition for a gel polymer electrolyte comprises an electrolyte solution solvent; an ionizable lithium salt; a polymerization initiator; and one or more monomers,
wherein the one or more monomers are selected from the group consisting of a monomer having a functional group bondable to metal ions, wherein the function group is any one selected from the group consisting of

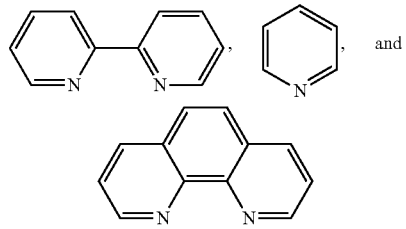

which are substituted or unsubstituted with C$_1$-C$_5$ alkyl or halogen, or a mixture of two or more thereof, and wherein the nitrogen on the functional group is unsubstituted, and a branched monomer having 2 to 6 acrylate
wherein the one or more monomers are the only monomers present in the composition, and
wherein the composition includes a monomer having a functional group bondable to metal ions.

15. The method of claim 14, wherein the polymerization is performed in a temperature range of 30° C. to 100° C.

16. The lithium secondary battery of claim 1, wherein the monomer having the functional group is a neutral material.

* * * * *